US005732086A

United States Patent [19]

Liang et al.

[11] Patent Number: 5,732,086
[45] Date of Patent: Mar. 24, 1998

[54] SYSTEM AND METHOD FOR DETERMINING THE TOPOLOGY OF A RECONFIGURABLE MULTI-NODAL NETWORK

[75] Inventors: Song-Chyau S. Liang, San Jose; Roberta T. Tung, Saratoga, both of Calif.

[73] Assignee: International Business Machines Corporation, Armonk, N.Y.

[21] Appl. No.: 531,724

[22] Filed: Sep. 21, 1995

[51] Int. Cl.[6] .................................................. H04J 3/24
[52] U.S. Cl. ............................ 370/410; 370/402; 370/403
[58] Field of Search .................................. 370/410, 402, 370/403, 217, 221, 351; 395/200.01, 200.11, 200.12, 200.06, 200.2, 200.3, 200.15

[56] References Cited

U.S. PATENT DOCUMENTS

| 4,912,656 | 3/1990 | Cain et al. | 364/514 |
|---|---|---|---|
| 4,914,571 | 4/1990 | Baratz et al. | 364/200 |
| 4,987,536 | 1/1991 | Humblet | 364/200 |
| 4,995,035 | 2/1991 | Cole et al. | 370/95.2 |
| 5,049,873 | 9/1991 | Robins et al. | 340/825.06 |
| 5,051,987 | 9/1991 | Conlon | 370/94.1 |
| 5,093,824 | 3/1992 | Coan et al. | 370/16 |
| 5,130,974 | 7/1992 | Kawamura et al. | 370/16 |
| 5,457,683 | 10/1995 | Robins | 370/403 |
| 5,495,471 | 2/1996 | Chow et al. | 370/221 |
| 5,506,847 | 4/1996 | Shobatake | 370/410 |
| 5,519,704 | 5/1996 | Farinacci et al. | 370/402 |
| 5,586,267 | 12/1996 | Chatwani et al. | 395/200.11 |

FOREIGN PATENT DOCUMENTS 4-207239  7/1992  Japan ................... H04L 11/00

OTHER PUBLICATIONS

IBM Technical Disclosure Bulletin, vol. 35, No. 1A –Jun. 1992 –'New Routing Algorithms for Large Interconnected Networks'.

Primary Examiner—Douglas W. Olms
Assistant Examiner—Shick Hom
Attorney, Agent, or Firm—Ohlandt, Greeley, Ruggiero & Perle

[57] ABSTRACT

A multi-node network manifests a changing topology of individual data processing nodes. An originating node transmits an initial identifier (ID) message over each interconnect link that emanates from itself. A receiver in the originating node receives an acknowledgement (ACK) message from each neighbor node, each ACK message including a neighbor node's link identifier for the link over which the ACK message was transmitted. The originating node constructs and stores a topology table entry which includes data from received ACK messages. Each entry includes a node identifier, an originating node link identifier and a neighbor node identifier from which an ACK message was received and a neighbor node link identifier for the link. An update procedure causes the transmitter to transmit to all other nodes, the originating node entry and further causes the topology table entries received from other nodes to be entered in the topology table of the originating node, so that all nodes in the system are enabled to thereafter identify the topology of the system.

10 Claims, 4 Drawing Sheets

| NODE ID | NEIGHBOR ON LINK | | | | LINK FROM NEIGHBOR | | | |
|---|---|---|---|---|---|---|---|---|
| | [a] | [b] | [c] | [d] | [a] | [b] | [c] | [d] |
| N1 | N2 | NULL | NULL | N4 | c | NULL | NULL | b |
| N2 | N3 | NULL | N1 | N5 | c | NULL | a | b |
| N3 | NULL | NULL | N2 | N6 | NULL | NULL | a | b |
| N4 | N5 | N1 | NULL | N7 | c | d | NULL | b |
| N5 | N6 | N2 | N4 | N8 | c | d | a | b |
| N6 | NULL | N3 | NULL | N9 | NULL | d | NULL | b |
| N7 | N8 | N4 | N7 | N9 | c | d | a | b |
| N8 | N9 | N5 | N7 | NULL | c | d | a | NULL |
| N9 | NULL | N6 | N8 | N7 | NULL | d | a | d |

TOPOLOGY TABLE

FIG. 3

SYSTEM AND METHOD FOR DETERMINING THE TOPOLOGY OF A RECONFIGURABLE MULTI-NODAL NETWORK

FIELD OF THE INVENTION

This invention relates to reconfigurable interconnection networks in multi-node data processing systems and, more particularly, to a system and method for enabling each node to rapidly determine the topology of the multi-node network.

BACKGROUND OF THE INVENTION

In a reconfigurable multi-node network, maintaining a consistent view of network topology in each node requires solution of a number of problems. For instance, many nodes do not have direct access to disk storage wherein topology information can be stored. In any event, each node should be able to discover the network topology at initialization time without any preexisting information regarding the existing topology. Further, the topology observed by each node should be able to be updated when a topology change occurs as a result of a failure of a node or link or the addition or subtraction of a node or a link. The solution to these problems is difficult, especially when network topology is large, dynamic and further, when communication overhead within the multi-node network must be minimized. The prior art has suggested various methods for enabling nodes in a multi-node network to maintain knowledge of the network's topology.

U.S. Pat. No. 4,912,656 to Cain et al., describes a satellite-based multi-node network wherein independent nodes determine what connections they can make to "improve network productivity" and the identified connections are then broadcast to all nodes in the network. Each node receiving the proposed connectivity changes then resolves conflicts and determines what change should be made in the individual nodes.

U.S. Pat. No. 4,914,571 to Baratz et al., describes a multi-node system wherein a requesting node first determines which resources reside within itself and then, if desired resources are not found, searches resources (known to a server node) which reside elsewhere in the network. The search then continues (if the requested resource is not found) to all associated nodes, etc.. U.S. Pat. No. 4,987,536 to Humbler provides a system for determining a shortest path from a starting node to a destination node. The system enables each node to form a routing tree and to communicate that routing tree to each adjacent node. Modifications to the routing tree are then made in accordance with information from adjacent nodes.

U.S. Pat. No. 4,995,035 of Cole et al., partitions a network into focal point nodes and non-focal point nodes and enables each focal point node to maintain a sphere-of-control table which lists the non-focal point nodes served by itself. U.S. Pat. No. 5,049,873 of Robins et al., describes a system for gathering status information regarding a communications network wherein a monitor node maintains topology data for the network. A method for updating the topology information is described.

U.S. Pat. No. 5,051,987 to Conlin discloses a multi-node network wherein each node accesses information relating to a then current topology of a network and transmits a message through appropriate connecting links. During an update state, each node interrogates each neighboring node regarding nodes which neighbor it. The process continues until all nodes have returned information regarding their neighboring nodes—thus enabling each node's topology to be updated. Coan et al. in U.S. Pat. No. 5,093,824 describes a multi-node network wherein each node stores a precomputed configuration table that corresponds to each of a plurality of possible network topologies which can result from a number of possible failure events. When such a failure event occurs, the precomputed configuration corresponding to the failure event is accessed and used for inter-node communication control.

U.S. Pat. No. 5,130,974 to Kawamura et al. describes a data communication network wherein nodes are interconnected by regular and spare routes. In the event of a line fault, request signals are transmitted to obtain permission to establish a new regular route to an adjacent node. The control network is then dynamically reconfigured in accordance with the presence or absence of request and grant signals. Other routing algorithms can be found in "New Routing Algorithms for Large Interconnected Networks" Bar-Noy et al, IBM Technical Disclosure Bulletin, Volume 35 No. 11992 pages 436, 437 and in published Japanese application 04-207239 of Masatoshi et al.

In general, the above noted prior art requires that each node have at least some information regarding immediate neighbor nodes and, in certain instances, requires a pre-loading of initial topology information from a centralized source. Further, considerable inter-node communications are required, especially when large tree configurations are transferred from node to node during the topology update process. This problem becomes especially important when dealing with large multi-node networks comprising hundreds and possibly thousands of interconnected nodes.

Accordingly, it is an object of this invention to provide a system and method for determining the topology of a multi-node network wherein message traffic is minimized.

It is another object of this invention to provide a system and method for determination of multi-node network topology wherein a centralized source of topology information is avoided.

It is yet another object of this invention to provide an improved method for enabling each node of a multi-node system to determine the system's network topology without requiring a pre-loading of information regarding network topology.

It is yet another object of this invention to provide a method and system which enables each node of a multi-node network to establish a local network topology table, and minimizes message sizes to implement such method.

SUMMARY OF THE INVENTION

A multi-node network manifests a dynamic and changing topology of individual data processing nodes. Each node is connectable to plural other nodes via full duplex interconnect links. Each node includes a processor, memory and programming means for enabling discovery of the reconfigurable topology. An originating node includes a transmitter which transmits an initial identifier (ID) message over each interconnect link that emanates from itself. Each ID message includes an originating node link identifier for the link over which the ID message is transmitted. Logic in the originating node provides a "time out" signal at an expiration of a time interval. A receiver in the originating node receives an acknowledgement (ACK) message from each neighbor node, each ACK message including a neighbor node's link identifier for the link over which the ACK message was transmitted back to the originating node. The originating node constructs and stores a topology table which includes data from received ACK messages. The topology table includes originating node and neighbor node entries for each neighbor node from which an ACK message is received. Each entry includes a node identifier, an originating node link identifier and a neighbor node identifier from which an ACK message was received and a neighbor node link identifier for the link. The protocol associates a null value with any link over which no ACK message is received prior to the first time out signal. An update procedure causes the transmitter to transmit to all other nodes, the originating node entry and further causes the topology table entries received from other nodes to be entered in the topology table of the originating node, so that all nodes in the system are enabled to thereafter identify the topology of the system.

BRIEF DESCRIPTION OF THE DRAWINGS

FIG. 3 is a topology table which is constructed and maintained in each of the nodes of FIG. 1.

DETAILED DESCRIPTION OF THE INVENTION

The protocol to be hereafter described enables nodes in a multi-node network to identify the network topology without previous information as to the topology. The protocol is preferably implemented by a software established state machine in each node in the network. The protocol essentially comprises three phases;

1. Self-Positioning—wherein each node determines what connections it has to its immediate neighbor nodes, if any. Based on message exchanges during this phase, a node constructs an entry about itself in an otherwise empty topology table within the node. A first time-out is used to determine when this phase ends. The first time-out begins when a node transmits initial greeting messages over its data links. This phase transits either to a Connecting state, where the node finds out about other nodes on the network, or if no neighbor nodes are heard from, to a Stable state as a "network" of one node.

2. Connecting—when the node tells other nodes in the network about itself, and conversely, finds out what other nodes are in the network. This is accomplished by each node sending to "All nodes" the topology about itself (i.e. an Update message). This also includes iterative forwarding of each node's "topology row" throughout the network. Redundant traffic is avoided by each interim node forwarding the information only when it differs from the content of its topology table. If the contents match (meaning the message has been seen before), the message is discarded. The topology information for a given node comes only from the node itself. This eliminates the possibility of information being out of synchronism which, in turn, can result in excess message traffic. A second time-out is used to determine when this phase ends. At the end of this phase, the node is in the Stable state and the node's topology table contains an entry for each node in the network. Further, each node's topology table is identical.

3. Adjusting—occurs when changes (addition / deletion / failure) are detected about nodes or links between nodes. This is reported by the node(s) detecting the change and is iteratively forwarded through the network, as described above. The second time-out is used to determine if the network is back in a stable state. When the node transits to the Stable state, the topology table in each node contains the same updates.

Figure 1:
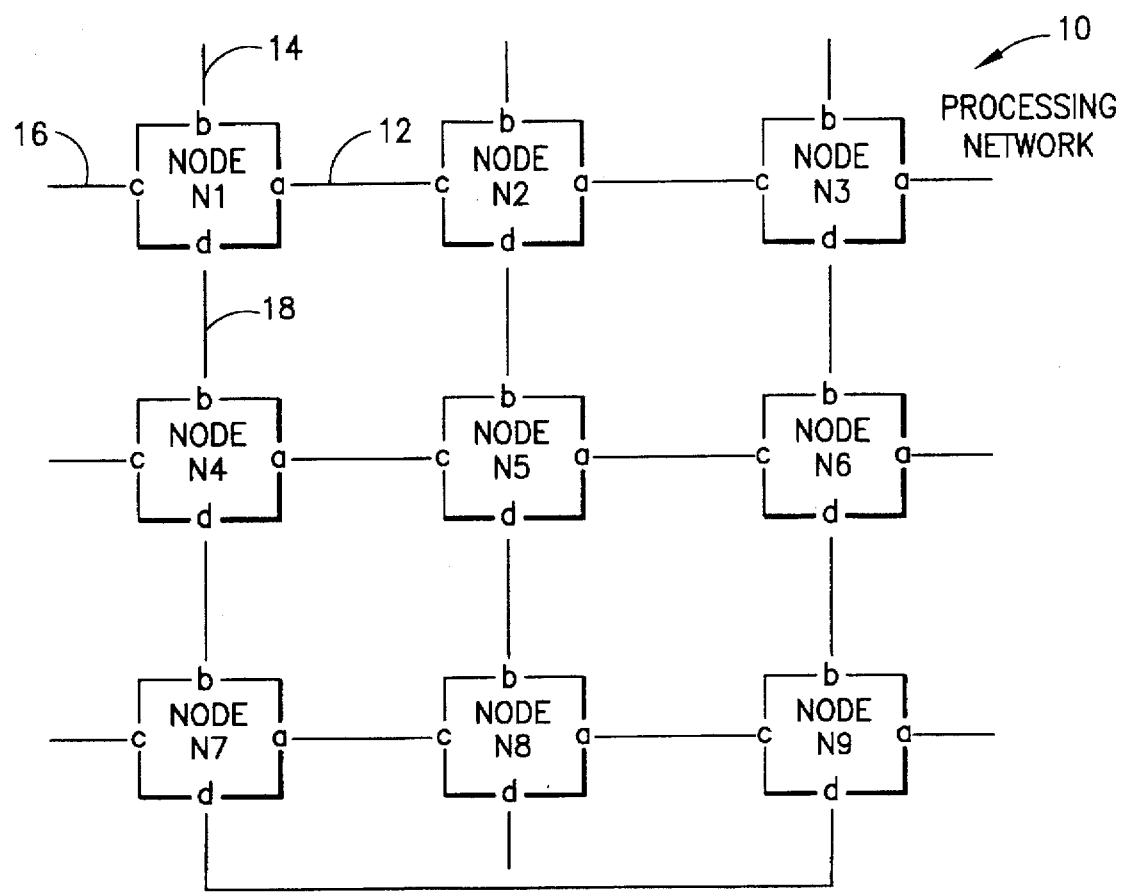
FIG. 1 is a block diagram of an exemplary multi-node data processing system.

Referring to FIG. 1, an exemplary nine node data processing network 10 is illustrated, comprises nodes N1-N9 and implements the topology protocol described above. Each node includes four full duplex communication links that are schematically shown in FIG. 1 as links 12, 14, 16 and 18 for node N1. Further, it is noted that node N1 denotes each of those respective link as link ports a, b, c, and d. By contrast, node N4 denotes link port 18 as link port "b" and node N2 denotes link 12 as link port "c". Thus, each node has its own designator for a link which may or may not be the same as a node connected at the other end of a link. Hereafter, a node connected one link away from another node will be termed a "neighbor" node. As will become hereafter apparent, each node has a unique identifier (e.g. N1-N9) and each node is able to both transmit and receive messages over each of links, 12, 14, 16 and 18. Further each node includes a timer facility for generating time out events.

Figure 2:
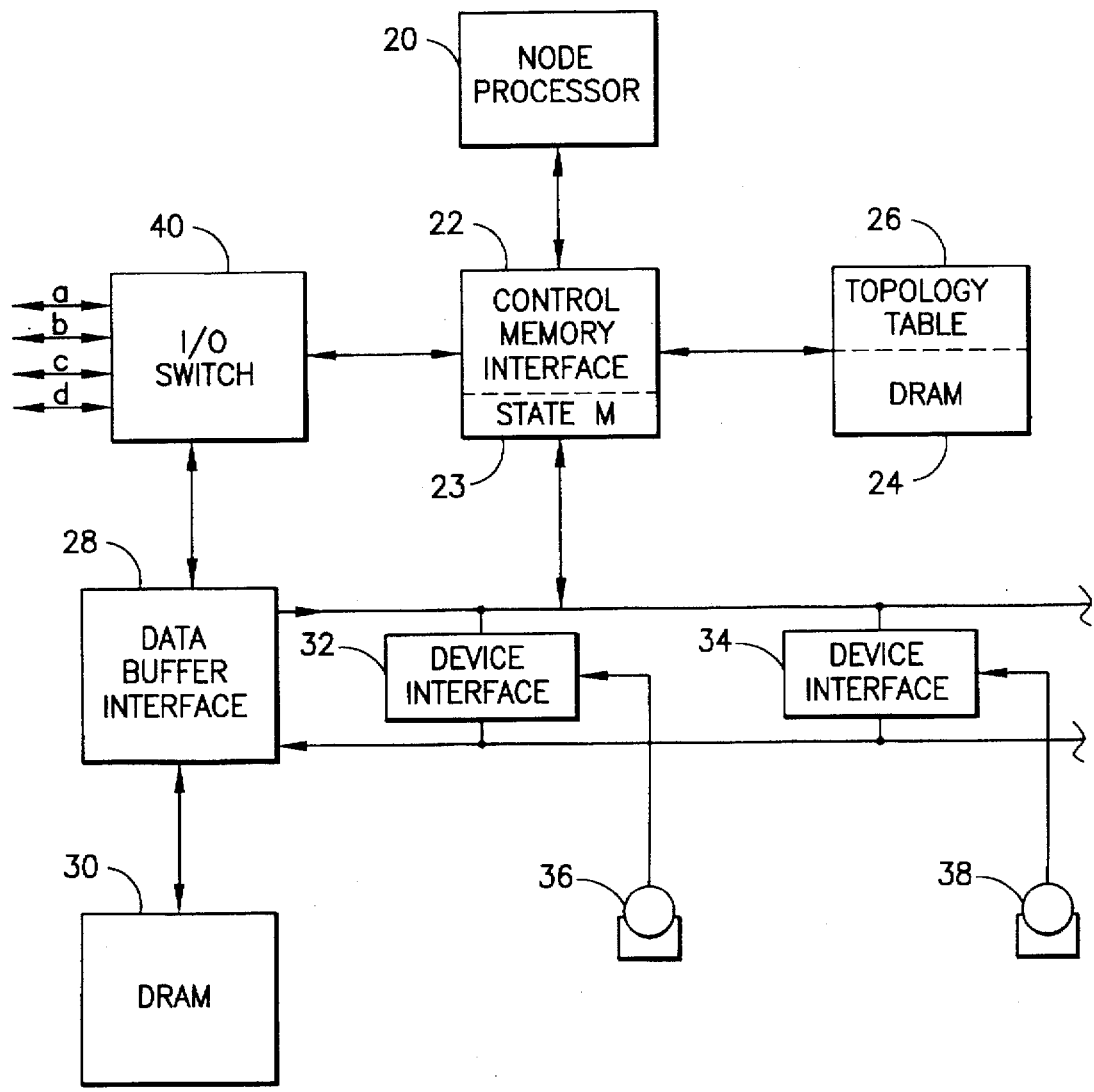
FIG. 2 is a block diagram of components of an exemplary data processing node shown in the multi-node system of FIG. 1.

Turning to FIG. 2, each of nodes N1-N9 is preferably configured from a common node arrangement of modules. Each node includes a node processor 20 that controls the overall functions of the node. Each node further includes a control message facility that comprises a control memory interface 22, a state machine 23, and a control message memory (DRAM) 24. DRAM 24 also is employed to maintain a topology table 26 whose functions will be considered below.

A data message facility is further included in each node and comprises a data buffer interface 28 at a data memory (DRAM) 30. Data buffer interface 28 connects to a plurality of device interfaces 32, 34, etc. which, in turn, connect to disk drives 36, 38 etc. Control messages originating from control memory interface 22 enable control of the various nodal actions within the node.

The respective control and data message facilities allow independent processing and transfer of control and data messages to an input/output (I/O) switch 40. I/O switch 40 includes means for both receiving messages which arrive on any of link ports a, b, c, or d and for transmitting messages over those links to neighboring nodes. Once a message is processed in I/O switch 40 and passed to control memory interface 22, the identity of the link over which the message was received is lost.

Control memory interface 22 is enabled to operate substantially independently of node processor 20 under a number of circumstances. One of those circumstances is during initiation when topology table 26 is generated and stored. Control memory interface 22 includes a state machine 23 which enables a node to independently develop an interconnect "row" for itself in topology table 26 and to transmit its respectively generated interconnect row to all other nodes within network 10 (FIG. 1). Topology table 26 can be represented as a table, but those skilled in the art will realize that its actual data structure is not necessarily tabular in form and that it is just necessary that it associates with each node identifier, the desired link information so as to enable that information to be appropriately communicated to other nodes in the network.

FIG. 3 illustrates topology table 26 which comprises three main columns, i.e., a node identifier (ID) column 50, a column 52 designating neighbor nodes that are connected to each of the identified node's links and a column 54 designating link identifiers assigned by the neighbor nodes to each of the interconnecting links to the node ID listed in column 50. Thus, node ID column 50 includes a row for each of nodes N1–N9.

"Neighbor on link" column 52 comprises four subcolumns, one for each of a node's link ports a–d. For each node ID listed in column 50, there is an entry in column 52 which identifies the neighbor node connected to the respectively noted link port. Thus, for node N1, node N2 is connected to link port a. No nodes are connected to link ports b and c, so null values are inserted. Lastly, as node N4 is connected to link port d, its identifier appeared in the "d" subcolumn.

Column 54 includes link port entries for each "link from neighbor" designator. For the row corresponding to node N1, link port c in node N2 is connected to link port a in node N1. Similarly, node N4 has its link port "b" connected to the d link port of node N1.

Each of nodes N1–N9 is initially responsible for deriving and updating its particular row of topology table 26. Then that row is communicated to all other nodes. Each node has no responsibility for either deriving or updating any row of topology table 26 other than its own designated row.

To implement the topology discovery protocol, network 10 employ three messages data structures, i.e., INIT, ACK and UPDATE. In addition, two time delays TO1 and TO2 are used during the protocol. TO1 is set equal to the maximum round trip delay for communications between a pair of neighbor nodes. TO2 is set equal to the maximum round trip delay between a pair of nodes located at the farthest ends of network 10.

An INIT (or initiation) message includes the following fields (not all of which are used during each message): "All nodes"—a value that represents all of the valid nodes in network; "Void link"—indicates an invalid (i.e., uninitialized) link identifier; "Send node"—indicates the identifier of the node sending an INIT message; "Send link" identifies the link port over which the INIT message was transmitted from the send node; and "Dest node"—indicates the identifier of the node to which the INIT message is eventually destined.

An ACK (or acknowledgement) message is a message transmitted by a node in response to receipt of an INIT message. The fields in the ACK message are as follows: "Recv node"—indicates the identifier of the node originating the ACK message; "Recv link"—indicates the link port of the neighbor node over which the ACK message is being transmitted to the node which generated the INIT message; "Send node" and "Send link" fields—both are identical to the Send node and Send link fields contained in the INIT message; and a "Dest node" field—defines the ultimate node for which the ACK message is destined.

An UPDATE message includes the same first five fields listed above for the ACK message as well as a field which contains the entire "topology table row"for the node originating an UPDATE message.

The above messages are dispatched and handled upon the occurrence of an "event". Those events are as follows; initialization; disconnection; time out; node isolated; node admitted; link failed and link added. Each event defines a condition where the network is either initializing its topology tables or a node or link has either been added, become inoperative or disconnected. In each case, one or more protocol messages is dispatched to accomplish an update of the network's topology tables and state machine.

The INIT message is transmitted by each initializing node to notify its neighbors about its existence and to ask for admittance to the network. An ACK message is used by a node which has received an INIT message from an initializing neighbor node, to acknowledge and admit that neighbor node to the network. The UPDATE message is used to ask the receiver of the message to UPDATE (including add or delete) a row of topology information in the receiving node's topology table.

For every transmitted protocol message, both the Send node field and the Send link field are transmitted and identify the sender and link, respectively, from which the message initiated. As indicated above, the Dest node field includes the node ID of the ultimate destination of the message. This field is checked by each receiving node to determine whether the message needs to be forwarded to other neighbor nodes. To minimize message traffic (and unnecessary message forwarding), each Dest node implements a procedure according to the following rules:

(1) if Dest node equals Recv node, no message forwarding is required;

(2) if Dest node equals All nodes and the topology row field in the received message is different from the corresponding row in the topology table maintained in the receiving node, the message is forwarded to all immediate neighbor nodes except the previous sender;

(3) if Dest node equals All nodes and the topology row is the same as the corresponding row in the topology table, the message is discarded and not further forwarded;

(4) if Dest node is not recognizable, the message is forwarded to the neighbor nodes as in case (2).

Protocol "events" are generated by state machine 23 or by other processes in the node. As described above, there are eight types of events. Each type of event defines its event data which needs to be processed by the state machine 23. An "initialization" event is generated when a node is to be initialized. A "disconnection" event is generated when the node needs to disconnect itself from the network. A "node isolated event" is generated when the node cannot find any neighbor node communicable and declares itself as the only active node in the network. A "node admitted" event is generated when the node is admitted to the network by all of its communicating neighbors. A "time out" event is generated by a timer when the time delay has expired. A "link failed" and "link added" event is generated by other processes when it is found that the status of a communication link on a node has changed.

Figure 4:
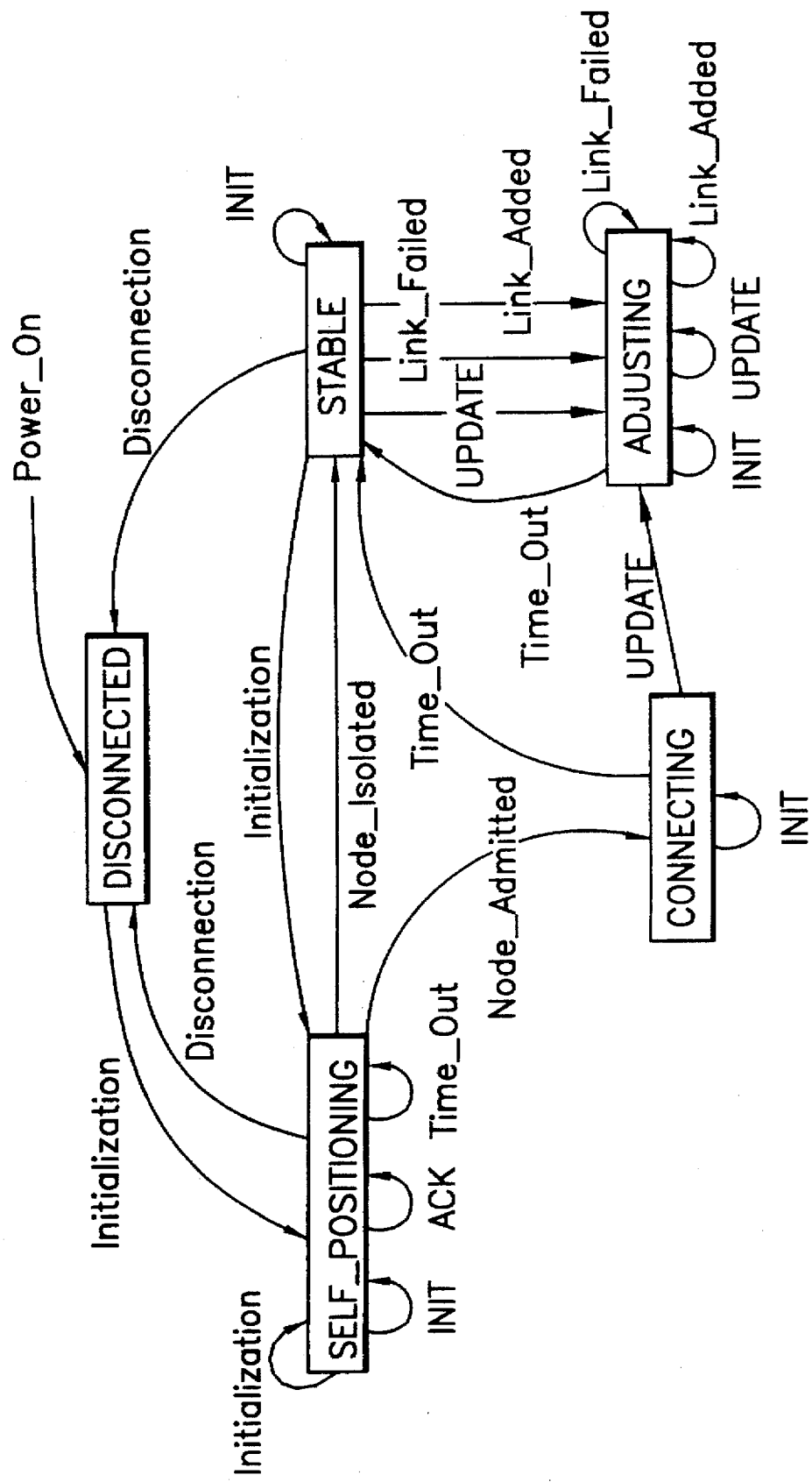
FIG. 4 is a state diagram which illustrates the various states and procedures which occur that enable the construction and updating of the topology table of FIG. 3.

Before proceeding to a specific description of the state diagram of FIG. 4 and a comprehensive listing of the various states and their actions, a brief description of the topology protocol will be given with respect to network 10 (FIG. 1). As indicated above, at initialization, each node is totally unaware of any other node in the network, but does know its own link ports. Each node commences by sending out an INIT message over its link ports. Any neighbor node (one link away) which receives the INIT message provides an ACK message back to the originating node. However, because the neighbor node does not necessarily know over which of its link ports the message was received (because the identity of the link port is lost once the message is passed into control memory interface 22), the ACK message is sent to all nodes connected to the neighbor node with the originating node's Send node, Send link and Dest node fields appended. The receiver of an ACK message will update its topology table only if the Dest node ID matches its own ID. Other nodes disregard the ACK message as their node IDs do not match the Dest node ID of the ACK message.

Once the originating node receives the ACK message from each of its neighbor nodes, it is enabled to insert node connection data into its row of topology table 26. If timer TO1 expires before an ACK message is received over a link, the originating node assumes that there is no node at the other end of the respective link and inserts a null value into its topology table at the appropriate link port.

At this stage, nodes N1–N9 have now accumulated sufficient data to complete their respective row in each node's protocol table 26. Thus, node N1 has identified all of its neighboring nodes, which node N1 link ports they are connected to and the neighboring node's connecting link port identifiers. Similarly, node N2 has derived its respective topology row, as have nodes N1 ... N9.

Each node now sends to "All nodes" its respective topology row data for entry into all other node's topology tables 26. By each node sending its own topology row, a possible race condition is avoided were a non-originating node to send topology information concerning another node, while a topology change was occurring at the "another" node. To the extent that other nodes receive duplicate information, that information is discarded and the row data is updated accordingly. Each topology table can further be updated during run time through use of the Update message.

The above operations will be understood in further detail by referring to FIG. 4 and the listing of topology state transitions listed below in Table 1. As shown in FIG. 4, state machine 23 is driven by the occurrence of the events described above.

State machine 23 has five states. "Disconnected" is a state which indicates that a node is disconnected from the network. In this state, a node is not allowed to communicate with other nodes and its topology table is void. The "Self Positioning" state means that the node is learning its topological position from its neighbor nodes. In this state, the node is only able to communicate with its immediate neighbors. The "Connecting" state means that a node has learned its topological position from its immediate neighbors, i.e., built its own topology row, and starts to tell other nodes about its topological position. The "Adjusting" state means that the node is receiving topology update information from other nodes and is merging the changes into its topology table. The "Stable" state indicates that the node considers the topology stable since it has not received a topology update from any node within the time duration TO2. As will be recalled, time duration TO2 is the round trip time for a message from the farthest node in the network. The initial state of state machine 23 (at power-on) is the Disconnected state.

The operation of state machine 23 in passing through the five stages shown in FIG. 4 will be completely apparent from the description below in Table 1 of the various state transitions which occur in response to the specifically indicated events.

TABLE 1

Topology Protocol State Transitions

| Current State | Event | Action(s) | Next State |
|---|---|---|---|
| DISCONNECTED or SELF_POSITIONING or STABLE | Initialization | 1) Initialize my Topology_Row as follows. node = my node id.; nbr_node[.] = VOID_NODE rev_link[.] = VOID_LINK; 2) Send INIT to every neighbor on the link from which no ACK has been received by the node yet. INIT.recv_node = ALL_NODES; INIT.recv_link = VOID_LINK; 3) Start timer with time delay TO1 | SELF_POSITIONING |
| STABLE or CONNECTING or ADJUSTING | Disconnection | 1) Send an UPDATE to every neighbor on the active link as follows. UPDATE.recv_node = UPDATE.dest_node = ALL_NODES; UPDATE.recv_link = the outgoing link id. UPDATE.Topology_Row.node = ny node id. UPDATE.Topology_Row.nbr_node[.]=VOID_NODE; UPDATE.Topology_ROW.rev_link[.]=VOID_LINK: 2) Void every Topology_Row in topology table. | DISCONNECTED |
| SELF_POSITIONING | Disconnection | 1) Void my Topology_Row in topology table. | DISCONNECTED |
| SELF_POSITIONING CONNECTING ADJUSTING STABLE | INIT | 1) Send ACK to the neighbor on every possible link as follows. ACK.recv_node = INIT.send_node; ACK.recv_link = INIT.send_link. | SELF_POSITIONING CONNECTING ADJUSTING STABLE |
| SELF_POSITIONING | ACK | 1) Update my Topology_Row as follows. | SELF_POSITIONING |

TABLE 1-continued

Topology Protocol State Transitions

| Current State | Event | Action(s) | Next State |
|---|---|---|---|
| | | nbr_node[ACK.recv_link] = ACK.send node; rev_link[ACK.recv_link] = ACK.send_link; 2) Restart the timer with time delay T01; | |
| SELF_POSITIONING | Time_Out | 1) If all the neighbors are not communicable, i.e., my Topology_Row is clear except the node field, generate Node_Isolated event. 2) Otherwise, generate Node_Admitted event. | SELF_POSITIONING |
| SELF_POSITIONING | Node_Isolated | No action. | STABLE |
| SELF_POSITIONING | Node_Admitted | 1) Send an UPDATE with my Topology_Row to every neighbor connected by an active link as follows. UPDATE.recv_node = nbr_node[link]; UPDATE.recv_link = rev_link[link]; UPDATE.dest_node = ALL-NODES; UPDATE.Topology_Row = my Topology_Row; 2) Start the timer with time delay T02. | CONNECTING |
| CONNECTING or ADJUSTING or STABLE | UPDATE | 1) Compare UPDATE Topology_Row with the Topology_Row addressed by UPDATE.Topology-Row.node in topology table. If match and UPDATE.dst_node = ALL_NODES, discard the received UPDATE and skip the following steps. 2) If UPDATE.dest_node = ALL NODES, then forward UPDATE to every neighbor on the active link except the previous sender. 3) If my node is specified as a neighbor on the link of the node in UPDATE.Topology_Row but the node is not a neighbor defined in my Topology_Row, update my Topology_Row as follows. nbr_node [UPDATE.Topology_Row. rev_link [link]] = UPDATE.Topology_Row.node; rev_link[UPDATE.Topology_Row.rev_link [link]] = UPDATE.Topology_Row.node; rev_link[UPDATE.Topology_Row.rev_link [link]] = link; 4) If my node is not specified as a neighbor of the node in UPDATE.Topology_Row but the node is a neighbor on the link in my Topology_Row, update my Topology_Row as follows. nbr_node[link] = VOID_LINK; rev_link[link] = VOID_LINK; 5) In case of (3) or (4), send an UPDATE of my Topology_Row to every neighbor on the active link as follows. UPDATE.recv_node = nbr_node[link] UPDATE.recv_link = rev_link[link]; UPDATE.dest_node = ALL_NODES; UPDATE.Topology_Row = my | ADJUSTING |

TABLE 1-continued

Topology Protocol State Transitions

| Current State | Event | Action(s) | Next State |
|---|---|---|---|
| | | Topology_Row;<br>6) If the Topology_Row in my topology table addressed by the received UPDATE.Topology_Row.node is VOID, send an UPDATE to the node as follows.<br>UPDATE.recv_node = the received UPDATE.send_node;<br>UPDATE.recv_link = the received UPDATE.send_link;<br>UPDATE.send_link = the received UPDATE.recv_link;<br>UPDATE.dest_node = the received UPDATE.Topology_Row.node;<br>7) Copy the received UPDATE.Topology_Row to the Topology_Row; | |
| ADJUSTING | ACK | 1) If my nbr_node [ACK.recv_link] = VOID_NODE, update my Topology_Row as follows:<br>nbr_node [ACK.rec_link] = ACK.send_node;<br>rev_link [ACK.rec_link] = ACK.send_link;<br>2) Send an UPDATE of my Topology_Row to every neighbor on the active link as step (5) in the above action.<br>3) Restart the timer with time delay T02. | ADJUSTING |
| CONNECTING or ADJUSTING | Time_Out | No action | STABLE |
| CONNECTING or ADJUSTING or STABLE | Link Failed (LF) | 1) Void fields in the Topology_Row associated with my neighbor on the link LF.link as follows.<br>nbr_node [recv_link[LF.link]] = VOID_NODE;<br>rev_link [recv_link[LF.link]] = VOID_LINK;<br>2) Void fields in my Topology_Row as follows:<br>nbr_node[LF.link] = VOID_NODE;<br>rev_link[LF.link] = VOID_LINK;<br>3) Send an UPDATE of Topology_Row to every neighbor connected by the active link as follows.<br>UPDATE.recv_node = neighbor's node_id;<br>UPDATE.recv_link = link;<br>UPDATE.dest = ALL_NODES;<br>UPDATE.Topology_Row = my Topology_Row;<br>4) Start the timer with time delay T02. | ADJUSTING |
| | Link_Added (LA) | 1) If there is no active link, i.e., my Topology_Row is clear,<br>Send INIT to the neighbor on the link LA.link as follows.<br>INIT.recv_node = ALL NODES;<br>INIT.recv_link = VOID LINK;<br>2) Start the timer with time delay T01. | ADJUSTING |

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A system manifesting a reconfigurable topology of individual data processing nodes, each node connectable to plural other nodes via full duplex interconnect links, a node directly connected to another node via a link hereafter referred to as a neighbor node, each node including processor means, memory and programming means for enabling discovery of said reconfigurable topology, an originating node further comprising:

transmitter means for transmitting an initial identifier message ID msg over each interconnect link emanating from said originating node, each ID msg including an originating node link identifier for the link over which said ID msg is transmitted;

receiver means for receiving an acknowledgement message ACK msg from each neighbor node, each ACK msg including a neighbor node link identifier for the link over which said ACK msg was transmitted to said originating node;

first logic means for constructing and storing in said memory, a topology table to include data from received ACK msgs, said topology table including an originating node entry, said originating node entry including an originating node identifier, an originating node link identifier associated with a neighbor node identifier from which an Ack msg is received, and a neighbor node link identifier for said link that is identified by said originating node link identifier; and update means for causing said transmitter means to transmit to all other nodes, said originating node entry and for causing topology table entries received from other nodes to be entered in said topology table of said originating node, said originating node retransmitting a received topology table entry from another node to a further node only if said received topology table entry differs from a corresponding entry in the topology table of said originating node, whereby all nodes in said system are enabled to thereafter identify the topology of said system.

2. The system as recited in claim 1, further comprising:

means in said first logic means for providing a link timeout signal at an expiration of a first time interval, and for associating a null value in said topology table for any link over which no ACK msg is received prior to said link timeout signal.

3. The system as recited in claim 2, wherein said link timeout signal is issued upon expiration of a time period for said ACK msg to be received from a neighbor node in response to an ID msg.

4. The system as recited in claim 2, wherein each ACK msg includes a copy of at least a portion of said ID msg from said originating node to enable said originating node to determine over which link said ACK msg was received.

5. The system as recited in claim 1, wherein said update means is further responsive to an event in said system which causes a topology of nodes connected to links of said originating node to change, to cause ID msgs to be transmitted by said transmitter means and to cause retransmission of said originating node entry to all other nodes after making any changes to said originating node entry as a result of received ACK msgs, if any.

6. A method for enabling individual data processing nodes in a multi-node data processing system to derive and update a topology for said system, without requiring initial information regarding said topology, a node directly connected to another node via a communication link hereafter referred to as a neighbor node, each node including processor means, memory and programming means for enabling discovery of said topology, said method comprising:

transmitting an initial identifier message ID msg over each interconnect link emanating from an originating node, each ID msg including originating node link identifier for the link over which said ID msg is transmitted;

receiving an acknowledgement message ACK msg from each connected and operable neighbor node, each ACK msg including a neighbor node link identifier for the link over which said ACK msg was transmitted to said originating node;

constructing and storing in said memory, a topology table to include data from received ACK msgs, said topology table including an originating node entry and at least a neighbor node entry for each operable neighbor node from which an ACK msg is received, each entry including a node identifier, an originating node link identifier associated with a neighbor node identifier from which an Ack msg is received via said link that is identified by said originating node link identifier, and a neighbor node link identifier for said link that is identified by said originating node link identifier; and transmitting to all other nodes, said originating node entry and causing topology table entries received from other nodes to be entered in said topology table of said originating node, said originating node retransmitting a received topology table entry from another node to a further node only if said received topology table entry differs from a corresponding entry in the topology table of said originating node, whereby nodes in said system are enabled to thereafter identify the topology of said system.

7. The method as recited in claim 6, further comprising the steps of:

providing a link timeout signal at an expiration of a first time interval; and associating a null value in said topology table for any link over which no ACK msg is received prior to said link timeout signal.

8. The method as recited in claim 7, wherein said link timeout signal is provided upon expiration of a time period for an ACK msg to be received from a neighbor node in response to an ID msg.

9. The method as recited in claim 7, wherein each ACK msg includes a copy of at least a portion of said ID msg from said originating node to enable said originating node to determine over which link said ACK msg was received.

10. The method as recited in claim 6, comprising the further steps of:

responding to an event in said system which causes a topology of nodes connected to links of said originating node to change, by causing ID msgs to again be transmitted; and retransmitting said originating node entry to all other nodes after making any changes to said originating node entry as a result of received ACK msgs, if any.

* * * * *